(No Model.)
R. E. SCHROEDER.
GRAIN AND OFFAL DRIER.
No. 273,767. Patented Mar. 13, 1883.
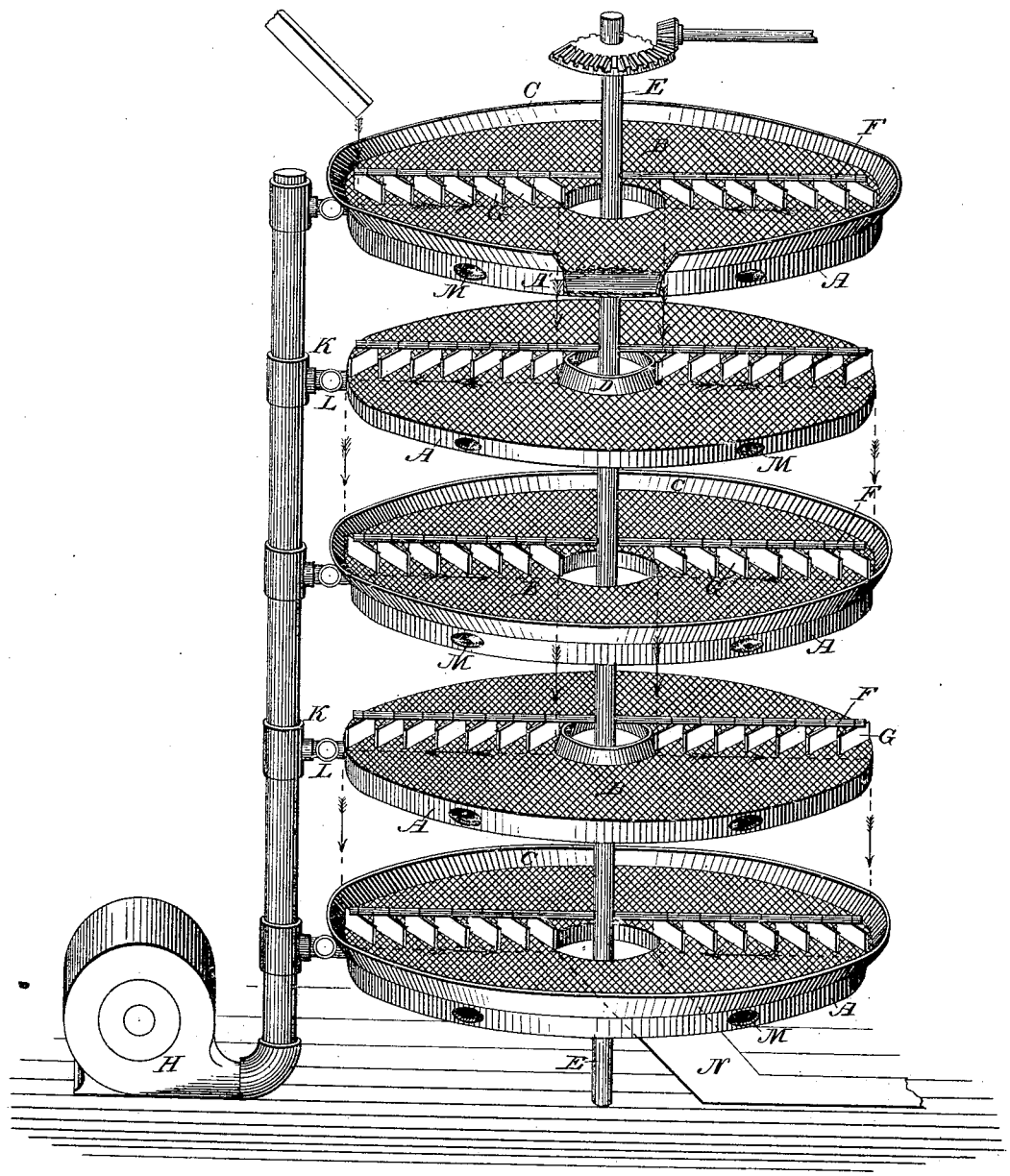
Witnesses.
Inventor.

United States Patent Office.

RICHARD E. SCHROEDER, OF CHICAGO, ILLINOIS.

GRAIN AND OFFAL DRIER.

SPECIFICATION forming part of Letters Patent No. 273,767, dated March 13, 1883.

Application filed May 13, 1882. (No model.)

*To all whom it may concern:*

Be it known that I, RICHARD E. SCHROEDER, of 67 Walton Place, Chicago, in the county of Cook and State of Illinois, have invented certain new and useful Improvements in Drying Grain and Offal of Distilleries, Glucose-Works, &c.; and I do hereby declare that the following is a full, clear, and exact description thereof, reference being had to the accompanying drawing, and to the letters of reference marked thereon, which forms a part of this specification.

My invention relates to an improvement in that form of drier in which the material to be dried is carried over a series of heated hollow metallic pans arranged one over the other, the material being kept in motion and transferred gradually from the upper to the lower pan of the series by means of rotary rakes revolving on a central vertical shaft, and arranged in such a manner that the material falls alternately from the periphery and from the center of the successive pans.

My invention consists in the construction hereinafter described, and particularly pointed out in the claim.

The general description of the machine is as follows:

The drawing is a perspective view of my improvement.

A A are the hollow metallic pans, showing a partial section at A'.

B B are the perforated top plates, on which the material to be dried is deposited.

C C are rims upwardly extended.

D D are rims upwardly contracted.

E E is the vertical shaft, which passes through all the pans. To this shaft are attached the rake-bars F F, with the movable rakes G G.

H is the blower, taking suction from a burning fire.

I is the main pipe, and K K the lateral pipes leading hot gases to the pans.

L L are the valves, by which the influx of gas to the pans is regulated.

M M are hand-holes or apertures, which can be closed by plates and grabs or clamps.

To operate the machine, the shaft E and the blower H are set in motion, the material is fed on the outer edge of the upper pan, when the rakes carry it to the orifice of the center, through which it drops to the pan below, and there, being carried outward by the rakes, is discharged over the edge to the pan beneath, and so on until it reaches the conveyer N.

I claim as new and of my invention—

The pans A, provided with perforated or wire-cloth top plates, air-tight bottom and sides, the hand-holes M being provided with hand-hole plates and grabs or clamps, for the purpose and arranged as specified.

In testimony that I claim the foregoing as my invention I affix my signature in presence of two witnesses.

RICHARD E. SCHROEDER.

Witnesses:
OTTO H. MAY,
HERMANN HEINZ.